Jan. 24, 1956

T. L. HANSON 2,732,271

STAMP DISPENSER FOR INSURANCE POLICY
VENDING AND VALIDATING MECHANISM

Filed Sept. 8, 1952

INVENTOR.
Theodore L. Hanson
BY
ATTORNEY.

INVENTOR.
Theodore L. Hanson
BY
ATTORNEY.

United States Patent Office 2,732,271
Patented Jan. 24, 1956

2,732,271

STAMP DISPENSER FOR INSURANCE POLICY VENDING AND VALIDATING MECHANISM

Theodore L. Hanson, Kansas City, Mo., assignor to Tele-Trip Policy Company, Inc., a corporation of Delaware Application September 8, 1952, Serial No. 308,378

1 Claim. (Cl. 312—39)

This invention relates to vending machines and particularly to apparatus for automatically dispensing and validating insurance policies automatically upon insertion of suitable coins, the primary object being to provide mechanism for use in connection with vending machines of this character for simultaneously vending to the purchaser-insured a postage stamp for use in mailing the policy to the insurance company.

It is quite common practice today for insurance companies to make insurance policies available to those about to board public conveyances, particularly airplanes. Many types of vending machines have herefore been provided capable of dispensing such policies, and it is usually incumbent upon the purchaser of the policy to mail the latter to the insurance company immediately after the purchase. In accordance with the present invention therefore, there is provided mechanism coupled with the policy delivering apparatus to automatically make a postage stamp available to the purchaser for each policy which he receives.

The most important object of the present invention is to provide a stamp dispenser that includes rotatable feeding structure in the nature of a pawl-actuated, toothed drum, together with novel mechanism for actuating or shifting the pawl each time the policy delivering structure is placed in operation.

A further object of this invention is to provide drum-actuating mechanism including a primary swingable arm, together with a secondary arm swingable thereby and swingably carrying a pawl engageable with ratchet means on the drum to impart step-by-step rotative movement on the latter each time the primary arm is swung or oscillated.

A further object hereof is to provide drum-actuating means including the aforesaid arms, the latter of which are pivotally and shiftably interconnected through the medium of a small sliding block carried by the secondary arm.

Figure 1:
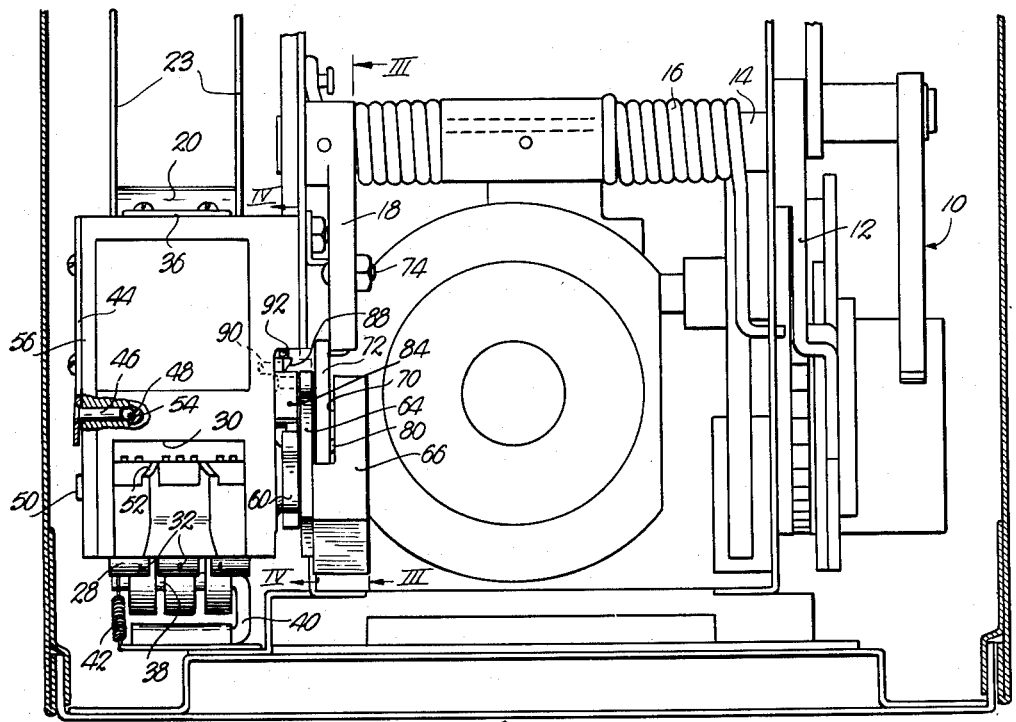
Figure 1 is a front elevational view partially in section with the cover removed of a stamp dispenser for insurance policy vending and validating mechanism made according to the present invention.

The structure for automatically discharging an insurance policy upon insertion of a coin or coins forms no part of the present invention, but is illustrated in part and broadly designated by the numeral 10 in Fig. 1 of the drawings. Structure 10 may be either automatically operated or manually controlled, and its operation serves to swing an arm 12 forming a part thereof and mounted upon a drive shaft 14 that is in turn biased toward one end of its path of travel by a spring 16 coiled thereabout.

It is through shaft 14 and particularly through a laterally extending arm 18 thereon that the stamp vending mechanism hereof is actuated. A roll of stamps 20 in tape form, is carried by a core 22 between plates 23, and the tape of stamps 24 is threaded from roll 20 beneath a guide 26, thence over a drum 28, and, when the machine is actuated, through an outlet opening 30. The stamps are interconnected in the tape 24 by transverse, perforated lines which are engaged by a series of teeth 32 on the drum 28. The guide 26 is swingably mounted as at 34 and is biased against the tape 24 by its inherent weight.

A leaf spring 36 engaging the guide 26 adjacent its swinging axis, retards the free swinging movement of guide 26. A roller 38 beneath the tape 24, is swingably mounted for movement toward and away from the guide 26 by a crank 40 and spring 42 yieldably holds the roller 38 biased against the tape 24 to in turn grip the latter between roller 38 and the guide 26.

Figure 2:
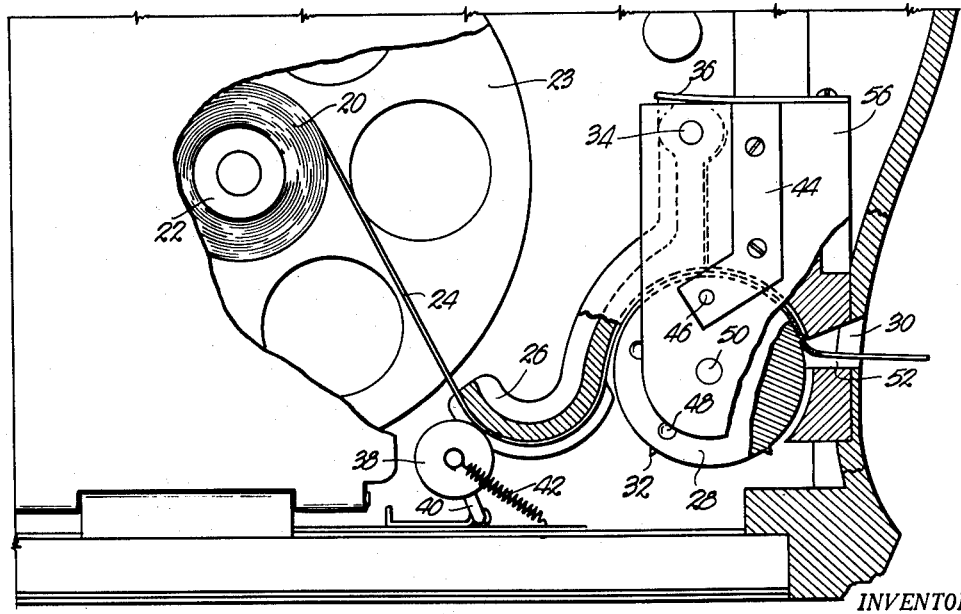
Fig. 2 is a fragmentary, side elevational view, parts being broken away and in section to reveal details of construction.

Step-by-step rotation of the drum 28, clockwise viewing Fig. 2, is in part controlled by a leaf spring 44 having a pin 46 successively engageable with a row of indentations 48 in one face of drum 28.

Figure 6:
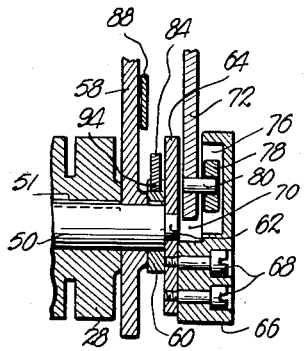
Fig. 6 is a detailed, cross-sectional view taken on line VI—VI of Fig. 3.
Figure 7:
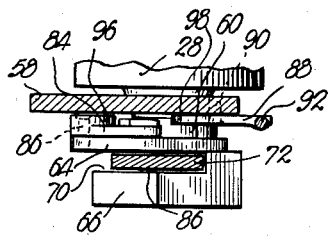
Fig. 7 is a cross-sectional view taken on line VII—VII of Fig. 5.

Drum 28 is mounted on a driven shaft 50 and is preferably formed from a plurality of spaced, disc-like, circular, integrally interconnected elements as shown in Figs. 1 and 6 of the drawings, keyed to shaft 50 as at 51. Figures 1 and 2 also illustrate the provision of a pair of guides 52 within the outlet opening 30 for receiving the stamp as it is vended. Parts broken away in Fig. 1 illustrate the provision of a small ball or other spherical element 54 between pin 46 and the drum 28, which ball 54 is received by the indentations 48.

Driven shaft 50 is rotatably carried by a pair of spaced-apart supports 56 and 58, the former of which also supports the leaf spring 44.

A small toothed ratchet 60, is keyed to the shaft 50 adjacent the support 58 and shaft 50 is in turn provided with a trunnion 62 of reduced diameter for rotatably receiving a small plate 64 spaced from the support 58 with the ratchet 60 disposed between support 58 and plate 64. The plate 64 has an arm 66 rigidly secured thereto by a pair of pins 68 on one side of the axis of rotation of driven shaft 50. Arm 66 is cutaway as at 70 to clear an offset extension 72 that is in turn bolted to the arm 18 as at 74 and depends therefrom, it being seen that the extension 72 is disposed between the arm 66 and the plate 64 within the cutaway portion 70.

An elongated, rectangular cavity 76 is formed in the innermost face of the arm 66 adjacent the cutaway portion 70 thereof. The longitudinal axis of the cavity 76 extends radially outwardly from the axis of rotation of shaft 50 opposite to the pins 68. A small rectangular block 78 is mounted within the cavity 76 for free sliding reciprocable movement along the longitudinal axis of cavity 76. Cavity 76 restrains block 78 from rotational movement relative to the arm 66 and from lateral displacement transversely of the cavity 76. Block 78 and extension 72 are pivotally interconnected by means of a pin 80.

Figure 4:
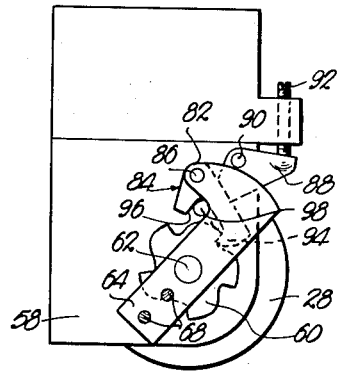
Fig. 4 is a detailed, cross-sectional view taken on line IV—IV of Fig. 1.
Figure 5:
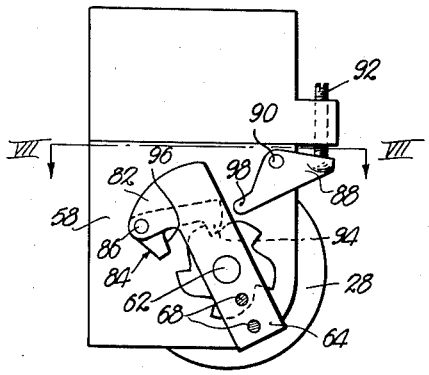
Fig. 5 is a view similar to Fig. 4 but showing parts at the opposite end of the path of travel thereof.

Plate 64 is substantially L-shaped as shown in Figs. 4 and 5, presenting a short leg 82 that pivotally receives a pawl 84 as at 86, pawl 84 being disposed between plate 64 and the support 58 above the ratchet wheel 60 for engagement therewith.

Figure 3:
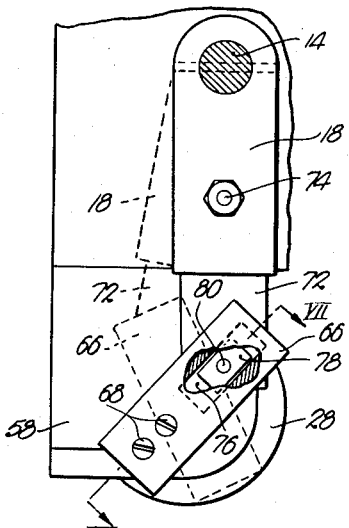
Fig. 3 is a fragmentary, cross-sectional view taken on line III—III of Fig. 1.

The extent of swinging movement of the plate 64 clockwise, viewing Figs. 3, 4 and 5, is limited by a triangular stop 88 within the path of travel of the pawl 84. Stop 88 is swingably mounted by means of a pin or the like 90 on the support 58 and, by manipulation of a screw 92 on support 58, the extent of movement of the stop 88 and accordingly, of the plate 64, in one direction, may be adjusted. Pawl 84 has an ear 94 engageable within the notches of ratchet 60 and an offset abutment 96 engageable with the end of a finger 98 on stop 88.

In operation, swinging of the arm 12 in one direction by the structure 10, imparts rotative movement to the drive shaft 14 against the action of spring 16. This swings arm 18 and its extension 72 from the full-line position to the dotted-line position shown in Fig. 3 of the drawings. As arm 18 and extension 72 swing, the block 78 moves within the cavity 76, radially outwardly from the axis of rotation of the driven shaft 50, while block 78 rotates relative to the extension 72. This action causes the arm 66 and plate 64 to swing away from the stop 88.

Manifestly, such swinging movement of the plate 64 carries the pawl 84 therewith, and by virtue of the locking engagement between pawl 84 and the sprocket wheel 60, the shaft 50, and thus the drum 28, are rotated. Rotation of drum 28 clockwise, viewing Fig. 2, moves a stamp, forming a part of the tape 24, through opening 30 and upon the guides 52 where the same may be torn loose by the customer. It is impossible to pull the tape 24 to obtain more than one stamp because of the teeth 32 on drum 28.

Upon release of the structure 10, and as arm 12 returns to a normal position by the action of spring 16, pawl 84, being swingable on the plate 64, will ride over the teeth of sprocket wheel 60 and reassume the position shown by full lines in Fig. 4. As abutment 96 strikes finger 98, ear 94 will be forced into place into the next successive notch in ratchet 60 and the extent of further return movement of plate 64 limited.

Having thus described the invention what is claimed as new and desired to be secured by Letters Patent is:

In a stamp vending machine, a drive shaft, a driven shaft extending parallel to said drive shaft, first arm means fixed at one end thereof to said drive shaft and extending toward said driven shaft, second arm means swingably mounted on said driven shaft and extending toward said drive shaft, a stamp feeding drum fixed on said driven shaft, means for rotating said drum including ratchet means mounted on said driven shaft and pawl means mounted on said second arm means and engageable with said ratchet means, means interconnecting said first and second arm means comprising a block rotatably mounted on the other end of said first arm means, said second arm means being formed with an elongated slot radially related to the axis of said driven shaft for receiving said block for longitudinal, non-rotatable movement therein and stop means positioned in the path of movement of said pawl means for limiting the movement of said pawl means and said second arm means in one direction, said stop means including means for directing said pawl means into engagement with said ratchet means.

References Cited in the file of this patent

UNITED STATES PATENTS

| | | |
|---|---|---|
| 362,482 | Batchelder | May 10, 1887 |
| 897,217 | Houlehan | Aug. 25, 1908 |
| 982,770 | Patterson | Jan. 24, 1911 |
| 1,057,598 | Van Der Werff | Apr. 1, 1913 |
| 2,512,380 | Quartullo | June 20, 1950 |
| 2,584,195 | Evans | Feb. 5, 1952 |
| 2,622,873 | Wenneche | Dec. 23, 1952 |
| 2,661,012 | Militano | Dec. 1, 1953 |